Feb. 27, 1934.  R. BLAHO  1,948,490
MACHINE FOR AND PROCESS OF FABRICATING CONTAINER
WALLS AND ACCESSORIES THEREON
Filed Nov. 12, 1931   6 Sheets-Sheet 3

INVENTOR.
Rudolph Blaho
BY Geo. B. Pitts
ATTORNEY.

Feb. 27, 1934.   R. BLAHO   1,948,490
MACHINE FOR AND PROCESS OF FABRICATING CONTAINER
WALLS AND ACCESSORIES THEREON
Filed Nov. 12, 1931   6 Sheets-Sheet 6

INVENTOR.
Rudolph Blaho
BY Geo. B Pitts
ATTORNEY.

Patented Feb. 27, 1934

1,948,490

UNITED STATES PATENT OFFICE 1,948,490

MACHINE FOR AND PROCESS OF FABRICATING CONTAINER WALLS AND ACCESSORIES THEREON

Rudolph Blaho, Cleveland, Ohio, assignor to The Byrne Manufacturing Company, Cleveland, Ohio, a corporation of Ohio Application November 12, 1931
Serial No. 574,581

20 Claims. (Cl. 153—2)

This invention relates to containers having one or more walls formed of sheet metal and particularly to the method of and machine for fabricating container walls and accessories thereon. The accessories herein referred to comprise bung rings or sputs for receiving plugs, faucets or threaded portions of a fixture, but the invention is not intended to be so limited. Furthermore, while the sheet metal wall is conveniently referred to as one wall of a container, the invention is not limited to the use of the wall for this purpose, since the wall and devices fabricated thereon according to my invention may be otherwise used.

One object of the invention is to provide a machine of the reciprocating press type having coacting and related elements which, in each operation of the machine, serve to mount a bung ring or sput in wall of sheet material.

Another object of the invention is to provide an improved machine having a pair of relatively movable members carrying dies so constructed and arranged that in each operation of said members a blank is formed with an opening and a bung ring or sput is mounted in and secured to the walls of the opening.

Another object of the invention is to provide an improved machine which is relatively simple and which is capable of performing a plurality of operations substantially simultaneously to mount a bung ring or sput in a sheet metal wall.

Another object of the invention is to provide an improved machine comprising a set of stamping elements and dies so related that, in each operation of the machine, the blank is formed with a hole, and a bung ring is mounted in the hole and secured to the surrounding walls thereof.

Another object of the invention is to provide an improved machine, which by a plurality of substantially simultaneous operations, is capable of rigidly mounting on a sheet metal wall a device, whereby saving in labor results.

Another object of the invention is to provide an improved fabricating machine of the above character in which the device to be mounted in the sheet metal wall is incorporated with the forming dies and co-acts with certain thereof to shape the metal into close fitting engagement with the device, whereby the metal of the sheet is formed to the exact size and shape of the device and the latter is more securely fixed to the sheet to prevent looseness or leakage.

A further object of the invention is to provide an improved process of attaching devices to a sheet metal wall.

A further object of the invention is to simplify the construction disclosed in my co-pending application Ser. No. 530,672, whereby cost of the machine is reduced and ease and speed of operation is increased.

Other objects of the invention will be apparent to those skilled in the art to which my invention relates from the following description taken in connection with the accompanying drawings wherein.

In the drawings, 1 indicates as an entirety a press. The frame of the press comprises side members 2, preferably connected at their upper ends, by an arch 3. At its lower portion, the frame 1 is shaped to provide seats 4 for a bolster plate 5. 2a indicate side plates secured to the side members 2 and forming guides for a slide 6, which through pitmen 7 and throws or cranks on a shaft 9, is reciprocated vertically. 10 is a gear keyed to a sleeve which is loosely mounted on one end of the shaft 9. The gear is connected to the shaft by a suitable clutch 11. The gear 10 is illustrated herein as driven by a pinion 10a, fixed to a jack shaft 10b. The shaft 10b is provided with loose and fast pulleys, power being applied to the latter to effect reciprocation of the slide 6. The operation of the clutch is controlled by a link 12, connected to a foot pedal 13.

The clutch 11 is of the type which releases the shaft 9 from the gear 10 following each down-stroke of the slide 6 and as it approaches the end of its up-stroke, a brake 14 being utilized as a safety device.

As the press 1 is of the usual form of construction, further description thereof will not be necessary.

The bolster plate 5 and slide 6 preferably carry in opposed relation one set of shaping or forming elements and one set of stamping or punching elements, the set of stamping or punching elements being incorporated with and co-operatively related to the set of shaping elements for conjoint operation therewith.

Figures 16, 17, 18, 19, 20:
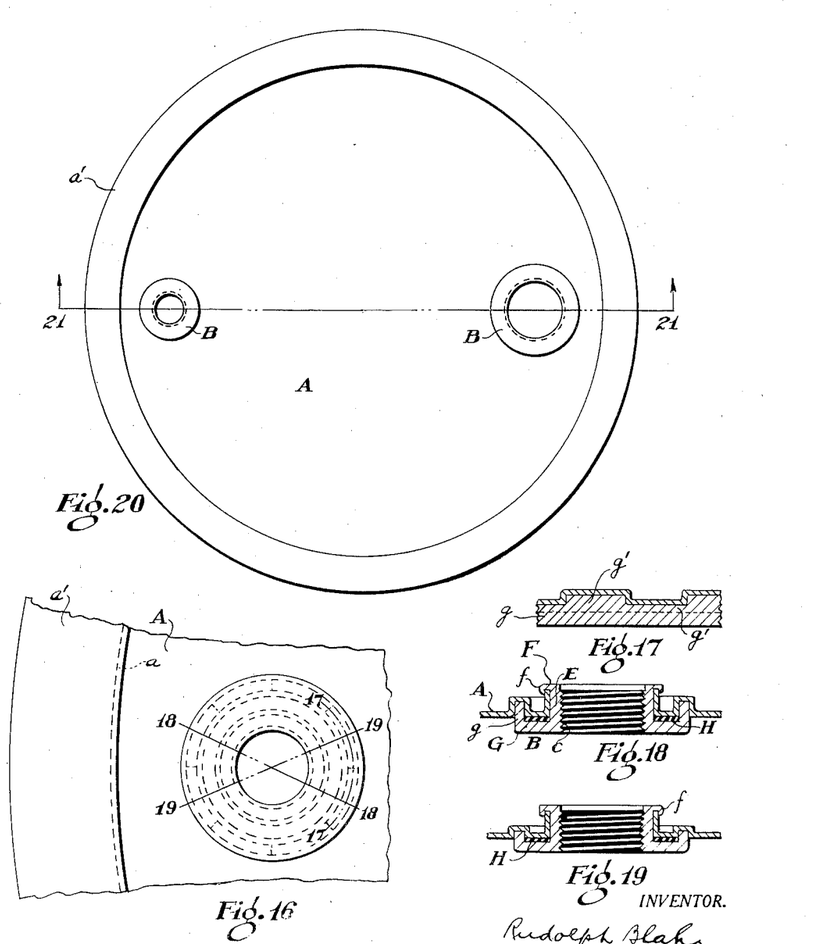
Fig. 16 is a plan view of a sheet metal wall showing the bung ring in position, enlarged.
Fig. 17 is a section on the line 17—17 of Fig. 16.
Fig. 18 is a section on the line 18—18 of Fig. 16.
Fig. 19 is a section on the line 19—19 of Fig. 16.
Fig. 20 is a plan view of a head for a container showing the bung rings mounted thereon.
Figure 21:
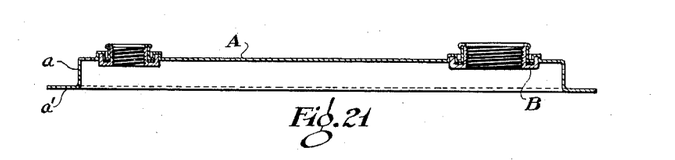
Fig. 21 is a section on the line 21—21 of Fig. 20.

In my above referred to application, two sets of stamping or punching elements and two sets of shaping or forming elements were shown in combination with a third set of shaping or forming elements, whereby the marginal edge portion of the blank was shaped for assembly with the side wall of a container and two bung rings were mounted in the blank. The present improvement lends itself for use in mounting two bung rings in or upon a sheet metal wall and for use in conjunction with a set of elements which shape the marginal edge portions of the blank, as shown in Figs. 20 and 21.

Where one bung ring or other device is to be mounted on the blank A, but one set of shaping elements and one set of punching elements conjointly related thereto are required, as herein illustrated.

The sets of elements as herein shown are adapted to apply bung rings to blanks A and are shown as applied to a blank which has been previously shaped to form a side wall a having a flange a'. In this application of the invention, the bolster plate 5 carries a removably and adjustably mounted base member 17 shaped to receive a removable block 34. One side wall of the block 34 is cut away to provide a vertical wall 34a which co-operates with pins 34b to form guides for the blank, the wall 34a being arranged to engage the blank wall a and the pins 34b being arranged to engage the peripheral edge of the blank flange a', whereby the bung ring will be mounted in the blank at a predetermined position relative to the wall a.

16 indicates as an entirety a set of forming, shaping and curling elements and the set of stamping or punching elements incorporated and co-operating therewith for mounting a bung ring B in or upon the wall of the blank A, as shown in Figs. 16 to 21, inclusive. Where two bung rings are to be so mounted, the blank A may be turned 180 degrees and the second bung ring applied. Where the bung rings are of different sizes, the blank may be passed to a separate machine, for the application of the second bung ring to avoid removing the set of elements from the machine which applied the first bung ring. The combined sets of elements 16 operate substantially simultaneously so that in each complete stroke of the slide 6, a container head is provided with a bung ring B ready for assembly with the side wall of a container. The combined sets of punching, forming and curling elements 16 are removably mounted on the bolster plate 5 and slide 6, whereby either or both may be removed. Such removal permits the substitution of other sets of punching, forming and curling elements, whereby different sizes and constructions of devices may be mounted on the blank A, examples of different constructions of bung rings being herein disclosed.

Of the sets of punching, forming and curling elements, 35 indicates a block provided with a hollow boss or tubular member 35a extending upwardly into an opening 6a formed in the slide 6, the tubular member being rigidly secured therein in any suitable manner. The purpose of the tubular member 35a will later appear. The opening 6a is elongated to permit the substitution of other forming elements where the center or axis of the latter is on a different radius relative to the axis of the blank A.

The base 17 is provided with outwardly extending lugs 17a which are suitably secured to the bolster plate 5. The base has an annular wall 17b which forms a pocket for the block 34, the latter being secured in the pocket in any desired manner. The bottom walls of the block 34 and base 17 are provided with registering openings 38, 39, respectively, the purpose of which will later appear. The upper portion of the opening 38 is enlarged as shown as 38a, to form a recess, which receives an annular member 40. The member 40 is provided with an upwardly extending tubular member 41. The upper end of the member 41 serves as the blanking die with which a punch 42 co-acts to stamp out of the blank A a section and thus form therethrough an opening, whereby the bung ring may be mounted in the latter and interlocked to the walls of the blank surrounding the opening. The openings 38, 39, below the member 40 are slightly larger than the openings through the member 41 and 40 to permit free discharge of the blanked out sections. The annular member 40 is secured to the bottom of its recess by two countersunk screws 40a (see Fig. 15).

41' is a collar surrounding and slidably fitting the tubular member 41 and arranged to form a seat for the bung ring B. 41x indicates a ring surrounding and slidably engaging the outer side wall of the seat 41' and co-operable with the shaping elements carried by the block 35, as later described. The seat 41' and ring 41x are operated vertically, as hereinafter set forth.

The punch 42 is provided on the lower end of a shank 43. The body portion of the punch 42 is disposed within and concentric to an annular curling or beading element 44 and extends downwardly below the latter for co-action with the blanking die 41 prior to the operation of the curling element. The curling element 44 is provided with a shank 45, which extends upwardly into the tubular member 35a and co-operates with the inner wall of the latter to slidably support a sleeve 46, to which reference will later be made. The shank 45 is formed with a recess in which the shank 43 of the punch 42 is removably secured by a set screw 47. The opening through the tubular member 35a is reduced at its upper end to form a shoulder 35' against which the shank 45 is rigidly secured by a countersunk screw 45a, the latter being locked by a set screw 45b.

My machine is adapted to mount various types of bung rings on sheet metal walls, but for illustrative purposes I have herein shown various forms of bung rings of the type comprising generally a neck or body portion, having a portion of its inner wall threaded, one end of the neck terminating in a non-threaded, relatively thin wall adapted to be bent or curled outwardly in radial directions and its other end being provided with laterally extending portions, such as an outwardly extending flange.

The set of combined punching, forming and curling elements 16 herein illustrated is constructed to mount in or upon the blank A a bung ring of the above type embodying the construction shown in the co-pending application of Fredrick J. Runser and myself Ser. No. 500,487 see Letters Patent No. 1,920,807. In this particular form of bung ring, shown in Figs. 15 to 21, inclusive, the bung ring comprises a neck E internally threaded at e and terminating in a non-threaded relatively thin wall F, which is bent or curled outwardly radially as shown at f, as later set forth. At its other end the neck E is provided with an outwardly extending flange G and the outer portion of the latter is bent inwardly, that is, toward the wall F, to form a collar g. The free or end edge of the collar g is provided with spaced projections or high and low portions g' (Fig. 17) with which the metal of the blank is interlocked, as later explained.

The remaining shaping or forming elements carried by the block 35 and conjointly related to the punch 42, comprise the following: 48 indicates a die consisting of related, relatively movable sections 48a, surrounding and slidably fitting the outer annular wall of the curling element 44. The sections of the die are movably mounted on a block or support 35x, and are arranged to fit into a recess 49 formed therein in the down stroke of the slide 6. The support 35x is formed integrally with the lower end of the sleeve 46 and moves therewith. The movement of the support 35x relative to the block 35 is limited in one direction by the engagement of the sleeve with the shoulder 35'; its movement in the other direction is limited by the engagement of annular insets, at the lower end of the sleeve, engaging annular shoulders 44a provided on the shank 45. The support 35x is slidably supported in the tubular member 35a, as above set forth, so that the curling element 44 may move relative to the die sections 48a to effect curling of the wall F, as will later appear. The support 35x is normally acted upon by a series of expansion springs 48' to move it downwardly, so that when the die sections 48a engage the blank and the ring 41x to form and shape the blank walls against or around the bung ring B, in the down stroke of the slide 6, and come to rest, the curling element will move relative to the die sections, as above set forth, to bead over the wall F. For this purpose, the springs 48' have sufficient resistance to insure operation of the die sections before movement of the block 35 and curling element 44 relative to the die sections takes place. The springs 48' are preferably mounted in aligned pockets 48x formed in the opposing walls of the blocks 35, 35x. The upper walls of the die sections 48a have tapered portions and the walls of the recess 49 have correspondingly shaped portions, so that in the downward movement of the slide 6, the walls 49 engage the tapered walls of the die sections 48a and hold them in rigid relation for co-action with the walls of the bung ring B and parts carried by the block 34 (see Fig. 15). In the upward movement of the slide 6, the die sections gravitate away from the walls of the recess 49 (see Fig. 10) and are free to swing outwardly radially, for a purpose to be later set forth; but in the down stroke of the slide 6 the die sections 48a engage the blank and are moved thereby into their recesses 49, the walls of which maintain them in rigid relation as the down-stroke is continued.

The active faces of the die sections 48a are formed with recesses 54, which are concentric to the axis of the punch 42 and curling element 44. The recesses 54 permit the active faces of the die sections to engage the metal at opposite sides of the collar g, so that such faces at opposite sides of the recesses 54, in forcing the blank into engagement with the flange G and those parts carried by the block 34, will draw the metal of the blank over the up-standing high and low portions g' of the collar g, the result being that the metal of the blank is formed or drawn over the collar g into engagement with the flange G and interlocked with the end walls of the high portions g', as shown in Fig. 17, to prevent rotative movement of the bung ring.

Figures 6, 10, 11, 12, 13, 14:
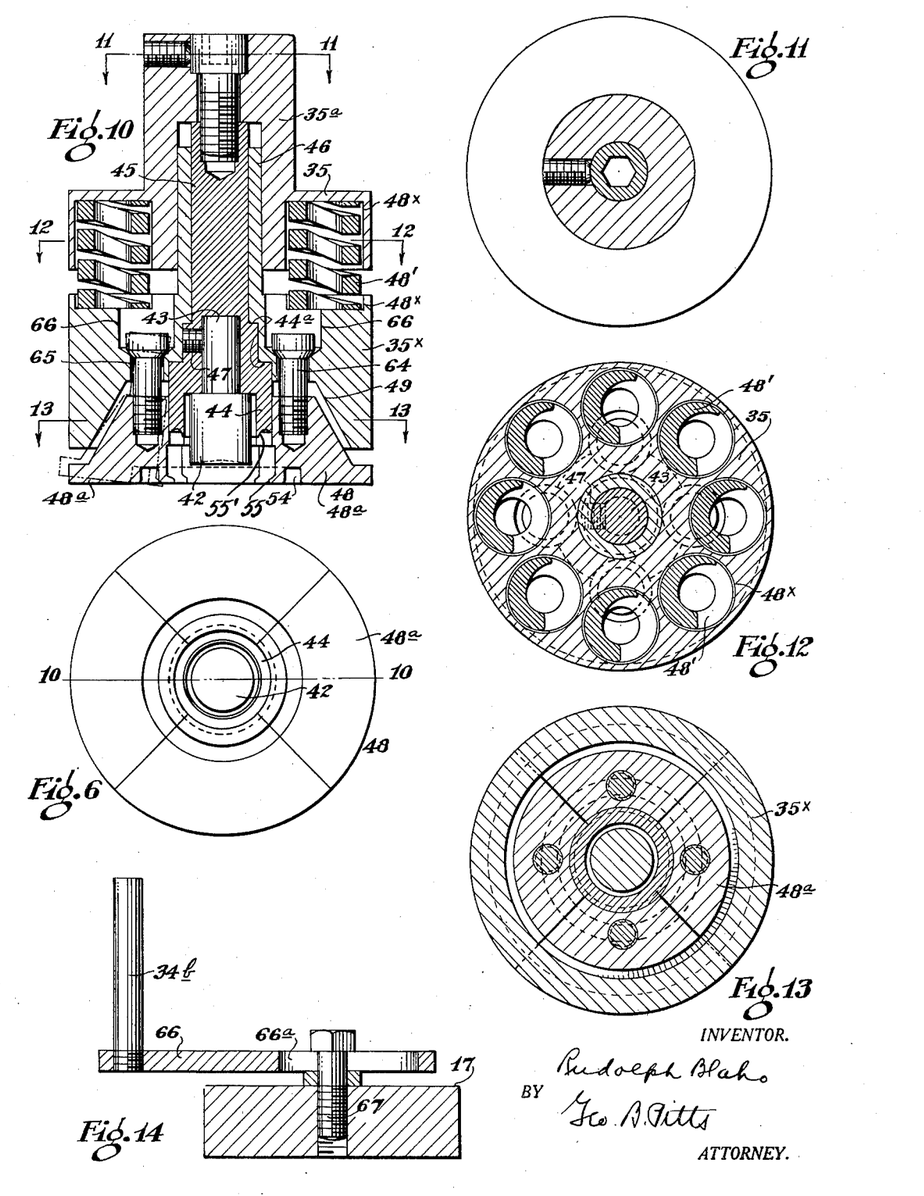
Fig. 6 is a bottom plan view of the upper die member.
Fig. 10 is a section on the line 10—10 of Fig. 6.
Fig. 11 is a section on the line 11—11 of Fig. 10.
Fig. 12 is a section on the line 12—12 of Fig. 10.
Fig. 13 is a section on the line 13—13 of Fig. 10.
Fig. 14 is a fragmentary section on the line 14—14 of Fig. 5.

Also in this downward movement of the slide 6, the inner edges 55 of the die sections 48a engage the metal of the blank surrounding the opening formed by the punch 42 and in co-action first with the tubular member 41, and then with the neck E of the bung ring shape the metal of the blank surrounding the opening into an up-standing flange or an annular wall x' (see Fig. 15) corresponding exactly to the shape and size of the bung ring neck E. As will be noted, the action of the forming edges 55 is such as to compress the metal tightly against the bung ring neck E, thereby minimizing danger of leakage or looseness, as well as sizing of the wall x' to the neck E. The curling element 44 has an active face 55' which is curved upwardly and outwardly (see Fig. 10) and is arranged to engage the relatively thin terminating wall F of the bung ring B and curl or bead it over the free edge of the wall x', as shown at f, in the down stroke of the slide 6. During the preliminary portion of the down stroke, that is, that portion of the stroke during which the active edges 55 and faces 48a of the die sections are shaping the metal of the blank to the neck and flange G of the bung ring, the die sections 48a and curling element move together as a unit, but when the resistance of the springs 48' is overcome, the curling element moves relative to the die sections and thus beads over the wall F, as shown in Fig. 10.

Figure 7:
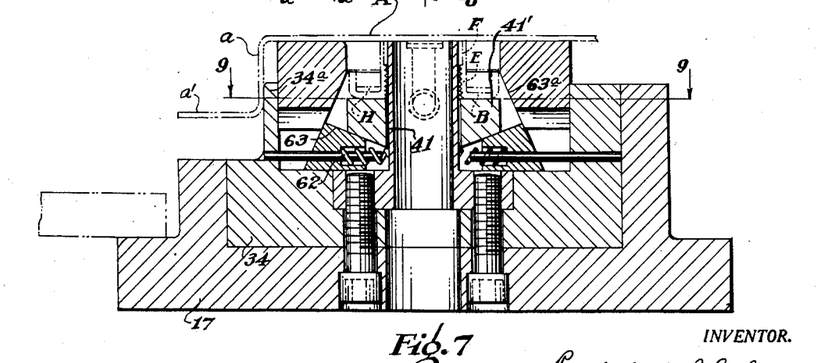
Fig. 7 is a section on the line 7—7 of Fig. 5.
Figure 8:
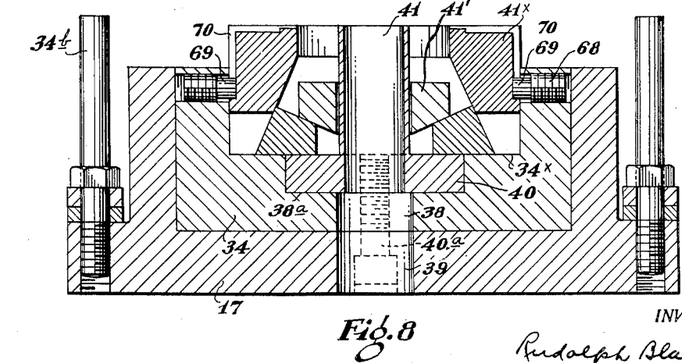
Fig. 8 is a section on the line 8—8 of Figs. 5 and 9.
Figure 9:
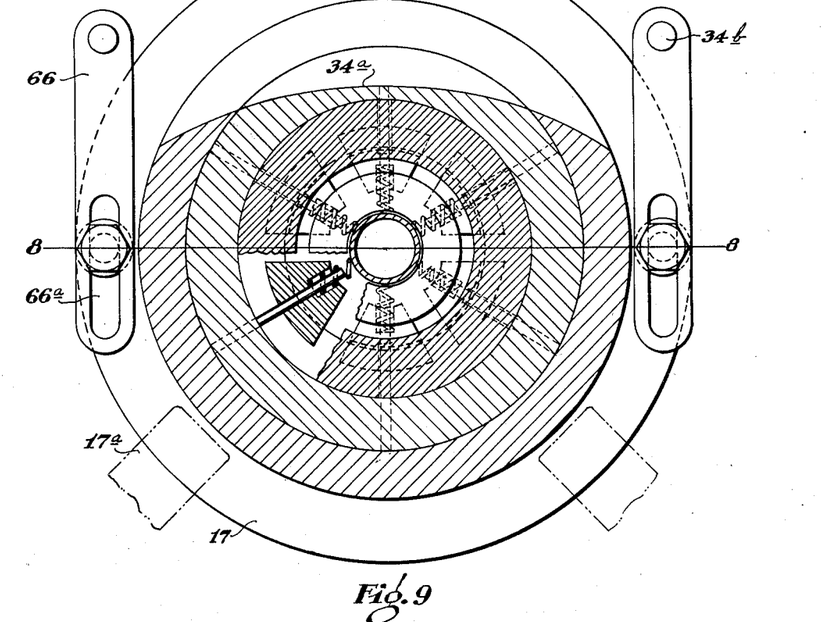
Fig. 9 is a section on the line 9—9 of Fig. 7.
Figures 15, 22, 23, 24, 25, 26, 27:
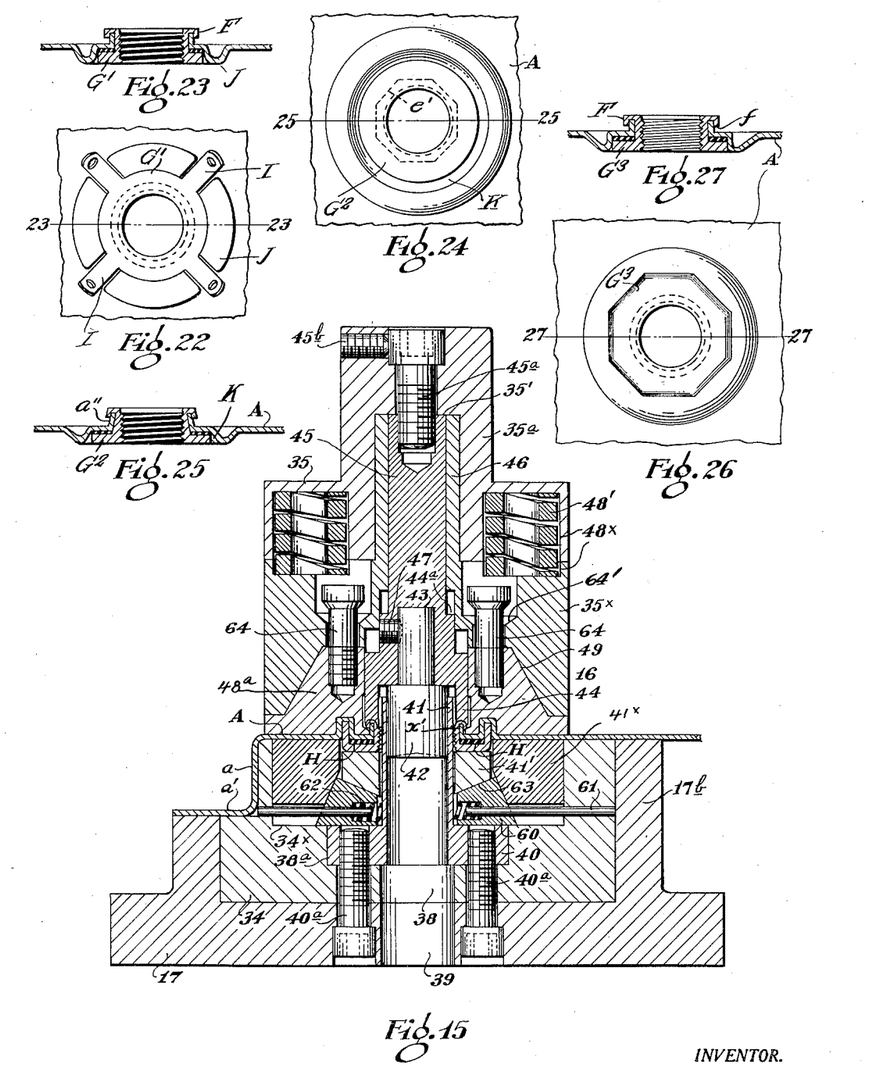
Fig. 15 is a section on the line 7—7 of Fig. 5 and 10—10 of Fig. 6, but showing the die members in operating position and completing the operation of securing a bung ring to a sheet metal wall.
Fig. 22 is a fragmentary plan view of a sheet metal wall showing mounted therein a bung ring having a construction different from that shown in Figs. 7 and 16 to 21, inclusive.
Fig. 23 is a section on the line 23—23 of Fig. 22.
Figs. 24 and 25 are views similar to Figs. 22 and 23, respectively, but showing another form of bung ring construction.
Figs. 26 and 27 are views similar to Figs. 22 and 23, respectively, but showing another form of bung ring construction.

For the purpose of giving the bead a complete curl or final set over the edge of the wall x', I provide means for moving the seat 41' upwardly as the curling element reaches the end of its downward movement, whereby the bung ring co-acts therewith to complete the beading operation. Of the moving means, 60 indicates a plurality of blocks slidable radially on the bottom wall of the base member 17. 61 indicates a rod extended radially through the central portion of each block 60 parallel to the bottom of the recess 34x formed in the block 34 to receive the seat 41', ring 41x and parts now being referred to. The outer ends of the rods 61 tightly fit into openings formed in the side walls of the block 34. The inner end portion of each block 60 is formed with an inwardly extending recess adapted to receive a coiled spring 62, which normally acts to move the adjacent block outwardly. The upper faces of the blocks 60 are inclined as shown at 63 and the lower face of the seat 41' is correspondingly inclined so that when the blocks 60 are moved inwardly, the seat 41' is elevated as shown in Fig. 15. The blocks 60 are moved inwardly by the ring 41x, due to the engagement of the die sections 48a with the blank A in their downward movement thereof and downward pressure exerted by the slide 6. In the down stroke of the slide, the die sections serve to shape the metal of the blank to form the tubular member $x'$ and form it over the flange G and collar $g$; following this operation the springs 48' yield and permit the curling element to bead over the wall F; as this operation is completed the block 35 engages the support 35x and exerts pressure therethrough and the die sections 48a, which pressure is exerted on the ring 41x to move it downwardly. As shown in Figs. 7 and 8, the lower inner annular wall of the ring 41x is inclined downwardly and outwardly, as shown at 63a and the outer end walls of the blocks 60 are correspondingly inclined, so that when the ring 41x is moved downwardly as above described, the blocks 60 are simultaneously moved inwardly, and these in turn move the seat 41' upwardly as already set forth. The downward movement of the ring 41x is limited by its engagement with the bottom of the recess 34x. When the pressure on the ring 41x is relieved, the springs 62 serve to move the blocks outwardly and they in turn move the ring 41x upwardly to normal position and permit the seat to move downwardly to the position shown in Figs. 7 and 8.

The die sections 48a are movably supported as follows: Each section is provided in its upper portion with a threaded opening for a bolt 64. The bolt 64 extends upwardly through an opening 65 leading into a recess 66 formed in the block 35x. The bottom of the recess 60 surrounding the opening 59 is rounded or conical shape, as shown at 64', to form a bearing for the bolt head, which is correspondingly shaped on its lower side and thus permits the bolt and the die section carried thereby to swing laterally as shown in dotted lines in Fig. 10. The opening 65 is large enough to permit the bolt 64 to (a) move endwise when the die sections move into engagement their tapered seats 49 (see Fig. 15) or gravitate away therefrom in the upward movement of the slide and (b) swing laterally, as shown in Fig. 10, whereby the active edges 55 of the die sections are free to ride the bead $f$ in the upward or receding movement of the slide 6. As the heads of the bolts 64 are larger than the openings 65, it will be seen that they support the die sections 48a in suspended position in the up-stroke of the slide 6 and in its down-stroke until they engage blank A.

From the foregoing description it will be seen that the bead $f$ serves to hold the bung ring in rigid or fixed engagement with the wall of the blank and the walls of the metal being interlocked with the high and low portions $g'$, prevent turning of the bung ring relative to the blank wall. As the high and low portions $g'$ are defined by walls at right angles to their free edges and the metal of the wall A is drawn over the edges formed by these right angled walls (see Fig. 17), it will be seen that by riveting or beading the wall F tightly over the annular wall $a'$, the bung ring is permanently mounted in the blank A. The pins 34b are preferably supported at the lower ends on plates 66. The plates are formed with elongated openings 66 through which bolts 67 extend, the latter being threaded into the flange of the base 17 and serving to clamp the plates thereto. By making the openings 66 elongated, the plates may be adjusted endwise, whereby the pins 34b may be spaced any desired distance from the wall 34a.

Figure 1:
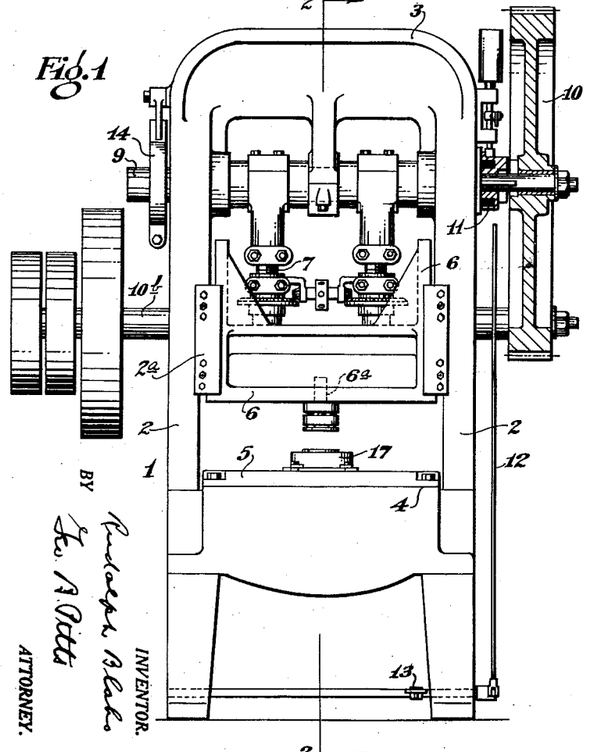
Fig. 1 is a front elevation of a machine embodying the invention and capable of carrying out the herein disclosed process, parts being in section.
Figures 2, 3, 4:
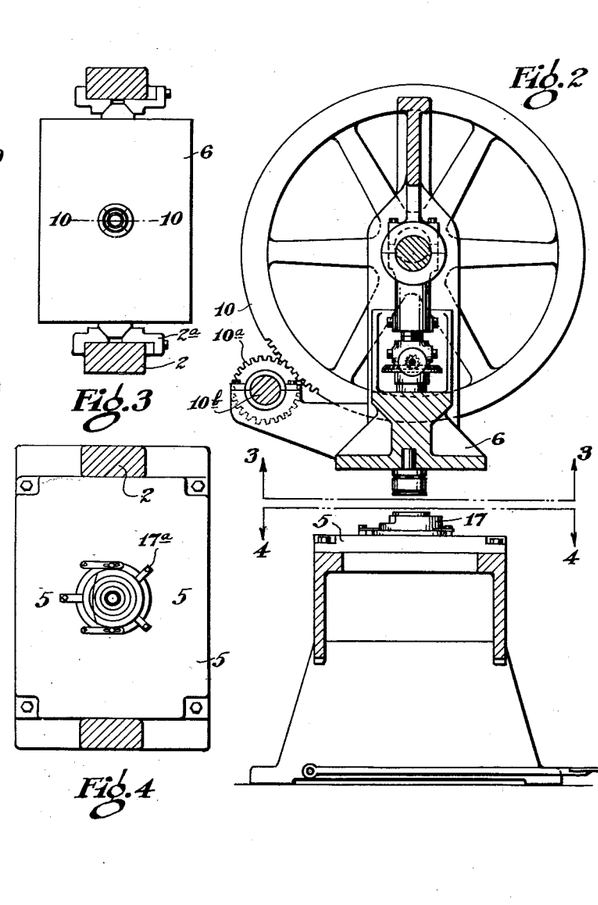
Fig. 2 is a section on the line 2—2 of Fig. 1.
Fig. 3 is a section on the line 3—3 of Fig. 2.
Fig. 4 is a section on the line 4—4 of Fig. 2.
Figure 5:
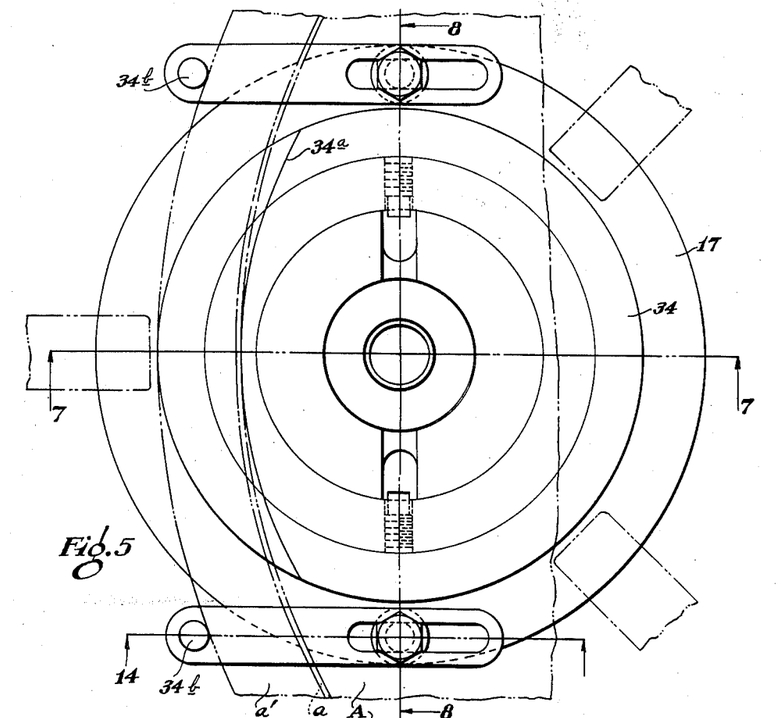
Fig. 5 is a plan view of the lower die member, showing in dotted lines the position of a blank thereon.

*Operation.*—With the slide in the up-position, as shown in Figs. 1 and 2, a bung ring B is seated on the annular wall 41' and a gasket H is positioned on the flange G of the bung ring; next, a blank A is positioned between the sets of elements 16, as shown in Fig. 7; and then the foot pedal 13 is operated, which applies power to the shaft 9, thereby operating the slide 6 down and up. As the slide 6 approaches the bolster plate 5, the die sections 48a engage the blank and are forced into their receiving recesses. As the down stroke continues, the punch 42 operates to blank out a section, which drops through the openings 38, 39, leaving an opening in the blank; following this the edges 55 draw the metal surrounding the opening down forming the neck $x'$ and the faces of the die sections 48a draw the metal over the collar $g$ into interlocking relation with the high and low portions $g'$ thereof. As the down stroke continues, the curling element engages the wall F and beads it over the end edge of the neck $x'$, and as the slide 6 reaches the end of its stroke the seat 41' is raised to set the beaded portion F into final position.

The ring 41x is preferably held against rotation by a pair of screws 68 threaded into openings formed in the block 34, the screws having extensions 69 fitting into vertical grooves 70 formed in the ring. The bottom of the grooves 70 are adapted to engage the extensions 69 to limit the upward movement of the ring.

Figs. 22 to 27, inclusive, show other forms of bung rings which may be mounted in a sheet metal wall A according to my process and machine such as illustrated herein, by substituting therein forming and curling elements corresponding to the shape of the bung ring flange and bung ring neck. In Figs. 22 and 23, I show a bung ring the flange G' of which is provided with a plurality of extensions I and the metal of the blank is up-set as shown at J, the up-set portions being spaced to receive between them the extensions I. In this arrangement the extensions are interlocked between the up-set portions J to prevent turning of the bung ring, whereas the beaded over wall F seals the bung ring in position. In Figs. 24 and 25 I show a bung ring having a flange $G^2$, the periphery of which is circular and seats into a pocket K formed in the wall A. In this form of construction the outer wall of the neck E is of polygonal shape as shown at $e'$ and the annular wall $a''$ provided on the blank A is of corresponding shape, thereby providing an interlock between the bung ring and the walls of the blank, to prevent rotative movement of the bung ring, the beaded over wall $f$ serving to secure the bung ring in its seat.

In Figs. 26 and 27 I illustrate a form of construction in which the bung ring is provided with a flange $G^3$ the periphery of which is of polygonal shape and seats into a correspondingly shaped pocket, so that the bung ring is held against turning and the wall F of the bung ring is riveted over as shown at *f* to secure the bung ring in its seat.

From the foregoing description it will be seen that each bung ring is interrelated and combined with the shaping or forming elements and the blanking elements so as to serve as one co-acting element to form the annular wall *x'*, which constitutes the seat for the bung ring neck E. This arrangement and operation is one reason among other which permits me to carry out my process and by a single cycle of movement of the slide, that is, a down-stroke and an up-stroke thereof, to form an opening in the blank, shape its walls and secure the blank and bung ring in permanently assembled relation.

My construction is also adapted to operate upon blanks A in which openings for the bung ring have been previously formed. When such blanks are employed, the punching element 42 is omitted.

To those skilled in the art to which my invention relates, many changes in construction and widely differing embodiments and applications of the invention will suggest themselves without departing from the spirit and scope of the invention. The disclosures and the description herein are purely illustrative and are not intended to be in any sense limiting.

What I claim is:

1. In apparatus of the class described, the combination of a pair of relatively movable members, a seat on one of said members for a bung ring having a neck and laterally extending portions at one end of the latter, co-operable elements on said members operated by the relative movement of said members, one toward the other, to first form an opening in a blank positioned between said members, provide an annular wall around said opening and to bend the opposite end of the neck over the outer end of the annular wall, and means for moving said seat upwardly.

2. In apparatus of the class described, the combination of a pair of relatively movable members, a seat on one of said members for a bung ring having a neck and laterally extending portions at one end of the latter, co-operable elements on said members operated by the relative movement of said members, one toward the other, to first form an opening in a blank positioned between said members, provide an annular wall around said opening and to bend the opposite end of the neck over the outer end of the annular wall, and auxiliary means operable subsequently to the operation of said members, for moving said seat upwardly.

3. In apparatus of the class described, the combination of a pair of relatively movable members, a seat on one of said members for a bung ring having a neck and laterally extending portions at one end of the latter, co-operable elements on said members operated by the relative movement of said members, one toward the other, to first form an opening in a blank positioned between said members, distend the metal of the blank to provide an anular wall around the opening, form the wall of the blank around the annular wall into interlocking engagement with the laterally extending portions of the bung ring and to bend the opposite end of the bung ring neck over the outer end of the annular wall, and means for moving said seat upwardly.

4. In apparatus of the class described, the combination of a pair of relatively movable members, a seat on one of said members for a bung ring having a neck and laterally extending portions at one end of the latter, co-operable elements on said members operated by the relative movement of said members, one toward the other, to first form an opening in a blank positioned between said members, distend the metal of the blank to provide an annular wall around the opening, form the wall of the blank around the annular wall into interlocking engagement with the laterally extending portions of the bung ring and to bend the opposite end of the bung ring neck over the outer end of the annular wall, and auxiliary means for operating said seat upwardly.

5. In apparatus of the class described, the combination of a base, a slide movable relative thereto, a blanking die on said base, a seat on said base surrounding said die, a punch carried by said slide and arranged to co-act with said blanking die, a curling element carried by said slide and surrounding said punch, a support having a die movably mounted on said slide, and compression means between said support and said slide arranged to yield in the downward stroke of the slide to permit said curling element to operate.

6. In apparatus of the class described, the combination of a base, a slide movable relative thereto, a blanking die on said base, a seat on said base surrounding said die, a punch carried by said slide and arranged to co-act with said blanking die, a curling element carried by said slide and surrounding said punch, a support on said slide, a plurality of die sections, means for swingably supporting said die sections on said support, and compression means between said support and said slide arranged to yield in the downward stroke of the slide to permit said curling element to operate.

7. In apparatus of the class described the combination of a base, a slide movable relative thereto, a blanking die on said base, a seat on said base surrounding said die and arranged to support a bung ring, a pair of upper and lower supporting members on said slide, a punch on said upper member arranged to co-act with said blanking die, a curling element on said upper member, a die on said lower member co-operable with the walls of the bung ring, and compression means between said members arranged to yield following the engagement of said die with the walls of the bung ring to permit said curling element to operate.

8. In apparatus of the class described, the combination of a base, a slide movable relative thereto, a tubular member on said base and terminating at its upper end in a blanking die, a seat on said base surrounding said tubular member and arranged to support a bung ring, a pair of upper and lower supporting members on said slide, a punch on said upper member arranged to co-act with said blanking die, a curling element on said upper member, a die on said lower member having active edges and faces co-operable with said tubular member and the walls of the bung ring, and compression means between said members aranged to yield following the engagement of said die with the walls of the bung ring to permit said curling element to operate.

9. In apparatus of the class described, the combination of a base, a slide movable relative thereto, a blanking die on said base, a seat on said base surrounding said die and arranged to support a bung ring, a pair of upper and lower supporting members on said slide, a punch on said upper member arranged to co-act with said blanking die, a curling element on said upper member, a die on said lower member, said die comprising a plurality of relative movable sections co-operable with the walls of the bung ring in the downward movement of the slide and arranged to move radially in the upward movement thereof, and compression means between said members arranged to yield following the engagement of said die with the walls of the bung ring to permit said curling element to operate.

10. In apparatus of the class described, the combination of a base, a slide movable relative thereto, a tubular member on said base and terminating at its upper end in a blanking die, a seat on said base surrounding said tubular member and arranged to support a bung ring, a pair of upper and lower supporting members on said slide, a punch on said upper member arranged to co-act with said blanking die, a curling element on said upper member, a die on said lower member having active edges and faces co-operable with said tubular member and the walls of the bung ring, said die comprising a plurality of sections pivotally connected to said lower member, means on said lower member arranged to engage said die sections and maintain them in rigid relation in the downward movement of said slide, and compression means between said members arranged to yield following the engagement of said die with the walls of the bung ring to permit said curling element to operate.

11. In apparatus of the class described, the combination of a base, a slide movable relative thereto, a tubular member on said base, a seat on said base surrounding said tubular member and arranged to support a bung ring, a pair of upper and lower supporting members on said slide, a curling element on said upper member, a die on said lower member having active edges and faces co-operable with said tubular member and the walls of the bung ring, and compression means between said members arranged to yield following the engagement of said die with the walls of the bung ring to permit said curling element to operate.

12. In apparatus of the class described, the combination of a base, a slide movable toward and from said base, a seat on said base arranged to support a bung ring having a neck, a pair of upper and lower supporting members on said slide, a curling element on said upper member, a plurality of die sections on said lower member having active faces co-operable with the walls of the bung ring neck to shape the blank into an annular wall around the latter, said die sections being relatively movable in the return stroke of said slide, and compression means between said members arranged to yield following the engagement of said die with the walls of the bung ring to permit said curling element to operate.

13. In apparatus of the class described, the combination of a base, a slide movable toward and from said base, a seat on said base arranged to support a bung ring having a neck, a pair of upper and lower supporting members on said slide, a curling element on said upper member, a plurality of die sections on said lower member having active faces co-operable with the walls of the bung ring neck to shape the blank into an annular wall around the latter, said die sections being relatively movable in the return stroke of said slide, compression means between said members arranged to yield following the engagement of said die with the walls of the bung ring to permit said curling element to operate, and means for raising said seat following the operation of said curling element.

14. In apparatus of the class described, the combination of a base, a slide movable relative thereto, a seat on said base arranged to support a bung ring, a pair of upper and lower supporting members on said slide, a curling element on said upper member, a die on said lower member having active faces co-operable with the walls of the bung ring to form the metal of a blank over the bung ring walls, compression means between said members arranged to yield following the engagement of said die with the walls of the bung ring to permit said curling element to operate, and means for raising said seat relative to said curling element while the latter is in its down position, said means being actuated by the downward pressure of said die.

15. In apparatus of the class described, the combination of a base, a slide movable relative thereto, a set of co-operable elements carried by said base and slide and arranged to receive between them a blank, the elements carried by said slide comprising a curling element and a die surrounding said element and the elements carried by the base comprising inner and outer relatively movable rings, the inner ring forming a seat, operating means between said rings, whereby the downward movement of the outer ring serves to raise said inner ring, and means for moving said slide downwardly, whereby the pressure of said die transmitted through the blank operates said outer ring.

16. In apparatus of the class described, the combination of a base, a slide movable relative thereto, a set of co-operable elements carried by said base and slide and arranged to receive between them a blank, the elements carried by said slide comprising a curling element and a die surrounding said element and the elements carried by the base comprising inner and outer relatively movable rings, the inner ring forming a seat, a series of cams for moving said inner ring upward, and arranged to be operated in one direction by said outer ring when the latter is moved downwardly, and means for moving said slide downwardly, whereby the pressure of said die transmitted through the blank operates said outer ring.

17. In an apparatus of the class described, the combination of a base, a slide movable relative thereto, a set of co-operable elements carried by said base and slide and arranged to receive between them a blank, the elements carried by said slide comprising a punch, a curling element surrounding said punch and a die surrounding said curling element and movable relative thereto, and the elements carried by the base comprising a blanking die and inner and outer relatively movable rings, the inner ring forming a seat, operating means between said rings arranged to be actuated by the downward movement of the outer ring to raise said inner ring, compression means between said die and slide and arranged to yield following the operation of the die to permit said curling element to operate, and means for moving said slide downwardly, whereby the pressure of said die transmitted through the blank operates said outer ring.

18. In apparatus of the class described, the combination of a base, a slide movable relative thereto, a set of co-operable elements carried by said base and slide and arranged to receive between them a blank, the elements carried by said slide comprising a curling element and a die surrounding said element and the elements carried by the base comprising inner and outer relatively movable rings, the inner ring forming a seat, a series of cams for moving said inner ring upward, and arranged to be operated in one direction by said outer ring when the latter is moved downwardly, means for moving said slide downwardly, whereby the pressure of said die transmitted through the blank operates said outer ring, and means normally tending to move said cams in the opposite direction.

19. In apparatus of the class described, the combination of a base, a slide movable relative thereto, a set of co-operable elements carried by said base and slide and arranged to receive between them a blank, the elements carried by said slide comprising a curling element and a die movably supported on said slide and surrounding said element and the elements carried by the base comprising inner and outer relatively movable rings, the inner ring forming a seat, operating means between rings and arranged to be operated in one direction by said outer ring when the latter is moved downwardly to raise said inner ring, compression springs between said die and said slide, and means for moving said slide downwardly, whereby the pressure of said die against the blank causes said die to yield and permits said curling element to operate and moves said outer ring downwardly.

20. In apparatus of the class described, the combination of a base on which a blank formed with an opening may be positioned, a seat with which the opening in the blank is concentrically related, said seat being adapted to support a ring having a neck, means for movably supporting said seat on said base, a slide movable toward and from said base, a curling element on said slide, and a die on said slide, said die and curling element being co-operatively related for sequencial operation in the active stroke of said slide to form the wall of the blank surrounding the opening therein around the bung ring neck and curl the free end of the bung ring neck over the formed wall, said die being arranged to engage said seat supporting means following the operation of said curling element to raise said seat relative to said curling element, whereby the latter imparts an additional curling action on the bung ring neck.

RUDOLPH BLAHO.